United States Patent [19]

Corvari et al.

[11] Patent Number: 4,516,264

[45] Date of Patent: May 7, 1985

[54] APPARATUS AND PROCESS FOR SCANNING AND ANALYZING MAIL INFORMATION

[75] Inventors: John Corvari; Joseph Ulvr; Raigo Alas, all of Guelph, Canada

[73] Assignee: United States of America Postal Service, Washington, D.C.

[21] Appl. No.: 644,153

[22] Filed: Aug. 27, 1984

Related U.S. Application Data

[63] Continuation of Ser. No. 343,727, Jan. 29, 1982, abandoned.

[51] Int. Cl.³ .............................................. G06K 9/36
[52] U.S. Cl. .......................................... 382/46; 382/1; 382/67
[58] Field of Search ..................... 209/584, 900; 382/9, 382/10, 28, 36, 44–48, 50, 52, 56, 1, 67

[56] References Cited

U.S. PATENT DOCUMENTS

| | | | |
|---|---|---|---|
| 3,178,688 | 4/1965 | Hill et al. | 382/67 |
| 3,381,274 | 4/1968 | Quade et al. | 382/46 |
| 3,432,032 | 3/1969 | Curphey et al. | 209/584 |
| 3,761,876 | 9/1973 | Flaherty et al. | 382/52 |
| 4,013,999 | 3/1977 | Erwin et al. | 382/44 |
| 4,205,341 | 5/1980 | Mitsuya et al. | 382/52 |
| 4,398,177 | 8/1983 | Bernhardt | 382/46 |

Primary Examiner—Leo H. Boudreau

[57] ABSTRACT

A system for analyzing destination addresses on pieces of mail transported serially past an optical scan area to determine whether the address is machine imprinted or handwritten. Based on the determination, an output is generated to control sorting the mail into either one grouping with printed or typed addresses (readable by machine) or another grouping with handwritten addresses (unreadable by machine). High intensity lamps are focused on each side of the scan area angled at a predetermined angle to the path of transport of the mail to illuminate the address. Arrays of photocells are positioned in vertical alignments, one array on each side of the transport path. The array on the side of the piece of mail bearing the address is activated by a piece of mail reaching the scan area to cyclically generate signals based on the characteristics of the addresses scanned. The signals are processed to reach the decision as to whether the addresses are imprinted or handwritten.

19 Claims, 13 Drawing Figures

APPARATUS AND PROCESS FOR SCANNING AND ANALYZING MAIL INFORMATION

CROSS REFERENCE TO RELATED APPLICATION

This application is a continuation of application of Ser. No. 343,727, filed Jan. 29, 1982, now abandoned.

BACKGROUND OF THE INVENTION

Apparatus to separate pieces of mail such as envelopes whose address information is readable by machine (printed destination address) from pieces of mail the address of which cannot be read by machine (handwritten destination address) is known from such patents as U.S. Pat. No. 3,432,032 issued Mar. 11, 1969, to D. G. Curphey et al. In that disclosure called "Presorting", each envelope passes a scan device having 72 photosensitive elements in vertical alignment. The elements take continuous readings during the entire transverse period of the envelope to produce 2 sets of 32 parallel output signals for transmission to decision circuits.

In the apparatus shown by this reference, photosensors are strategically located to signal the entry of an envelope into the area monitored by the photosensitive elements. The photosensor activates the elements to continue the production of output signals until a trailing edge sensor indicates that the envelope has passed the scan area.

In the reference machine, detection of skewing of the address is accomplished within the logic network by checking the difference between readings in a first and second interrogation cycle and by combining skew detection with a determination of character height. Characters above a predetermined height are considered non-machine readable leading to a decision of that type.

Further, the reference machine uses an optic fiber bundle to illuminate an area of the envelope corresponding to the length of the photosensitive array which is disposed in close physical proximity to the envelope. A number of problems arise in such a device such as damage of the fibers and the photosensitive array because of the closeness to the moving mail and the necessity for custom fabrication of each scan unit. Further, the requirements for the parallel processing of 32 parallel signals seriously limits the amount of processing implemented in each channel because of cost considerations. This drawback is amplified if the area of the envelope to be scanned is increased in dimension.

SUMMARY OF THE INVENTION

The present invention is directed to an optical system for scanning the face of a piece of mail such as an envelope to locate the address block on the envelope and to read out sufficient information from the block to determine whether or not the address is printed (readable by machine) or handwritten (unreadable by machine). The information is transmitted to microprocessor controlled logic to reach a decision as to the nature of the address for the disposition of the envelope in accordance with that decision.

The optical system is comprised of a vertical alignment (array) of closely spaced photo diodes which scan an envelope as it traverses the scan area on a conveyor. A lens system acts to form an image of the face of the envelope on the photo diode array. Selected serial output data from the diode array is converted to digital data to result in a train of bits of information which is stored for analysis. Successive scans are made and analyzed for a decision as to the machine readability of the address block.

It is therefore an object of the invention to provide an improved sorting apparatus for mail in which an optical scanning apparatus performs periodic successive scans for analysis. The optical apparatus in one form includes a lens imaging system which reduces the scanned image to a size which can be monitored by a photodiode array located in the vicinity of the path of the envelopes.

It is a further object of the invention to provide a scan system which is capable of viewing an area of approximately 5 and 3/4 inches in height on the face of the envelope, yet is capable of sufficient resolution to enable a decision to be reached as to the nature of the destination address, whether printed or handwritten, within an address zone area which maybe as large as $2\frac{1}{2} \times 8\frac{1}{2}$ inches.

It is a further object of the invention to process scanned video information from the face of an envelope to make it more suitable for data extraction. The processing includes analog to digital transformation, noise reduction, bit compression (both in the horizontal and vertical directions), and vertical to horizontal transformation so that data obtained by vertical scans can be analyzed in a horizontal direction.

It is a further object of the invention to provide apparatus for extracting both horizontal and vertical characteristics of scanned data by the use of character spacing detectors, line distance detectors, and line height detectors. Several detectors are employed to cover the range of print possible on an envelope.

It is a further object of this invention to produce maps based on the outputs of each of a plurality of data characteristic detectors for storage in a microprocessor memory. In this manner the geography (areas of the envelope where each detector is activated) of the envelope may be retained for use in decision making logic.

It is a still further object of this invention to provide apparatus and method of analyzing the character spacing, line spacing and line height maps in memory, employing several software tests in order to obtain a "vertical score" and a "horizontal score" for each envelope. The size and relationship of these scores, in conjunction with other factors are used to make a decision as to whether an address is printed or handwritten.

Other objects, features and advantages of the invention will become apparent from the drawings described briefly hereafter and viewed in conjunction with the following specification.

BRIEF DESCRIPTION OF THE DRAWINGS:

FIG. 4 B shows the preferred pattern of pixels or picture information elements used for background subtraction within the flow chart of FIG. 4A;

DETAILED DESCRIPTION

Figure 1:
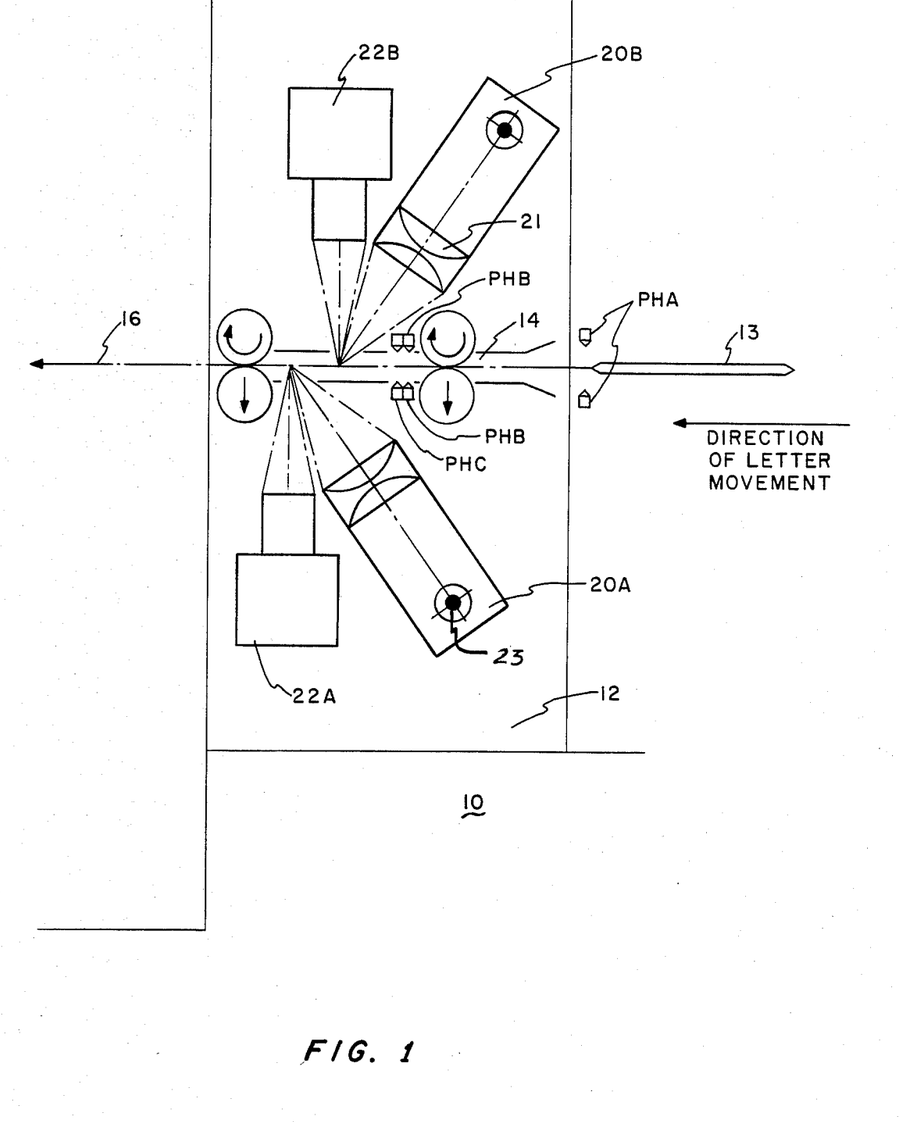
FIG. 1 is a plan view showing the physical location of the scanning apparatus of the invention.

FIG. 1 shows the scan area portion of a mail sorting apparatus 10 of a type similar to that shown in the patent cited previously. In the present apparatus, mail such as an envelope 13 is transported on one longitudinal end such as with the stamp adjacent the bottom edge (stamp down) along a table or platform 12, the envelope being held upright between two rollers, or the like. The envelopes are carried one at a time along the travel path indicated by centerline 14 in the direction designated by arrow 16, and by the arrow designated Direction of Letter Movement.

Along the travel path, a first set of photocells PHA senses the leading edge of an envelope entering the scan area. Two further sets of photocells PHB and PHC are spaced from photocell set PHA. Photocell set PHB is spaced a predetermined distance downstream in the travel path from the photocell set PHA. Cell PHA and PHB are used to determine letter length, and entry of the letter into the scan area. The third set of photocells PHC is located above and slightly downstream of photocell set PHB for the purpose of sensing a skewed condition of an envelope in the scan area, as will be described more fully.

Figure 2A:
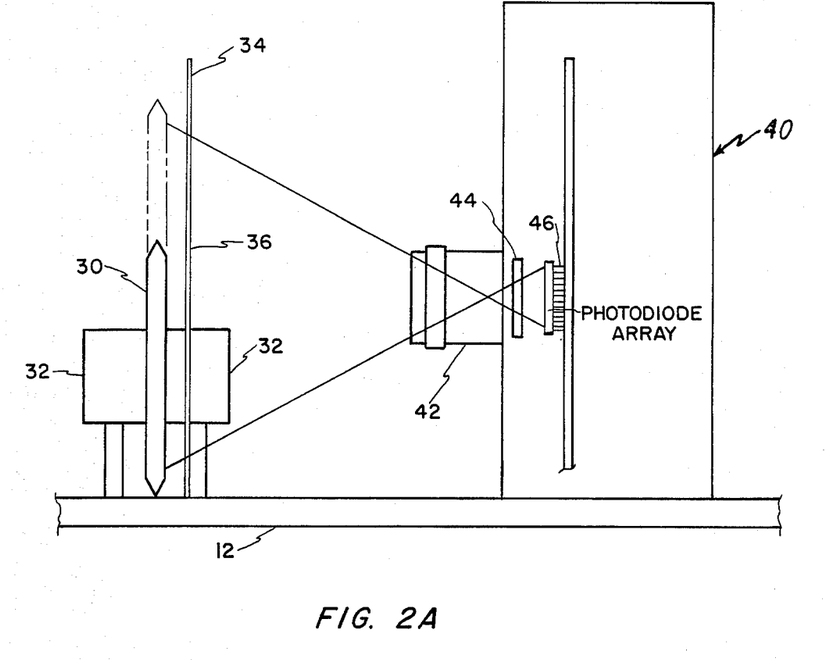
FIGS. 2A and 2B are respectively the side views of the scan camera and the source of illumination.
Figure 2B:
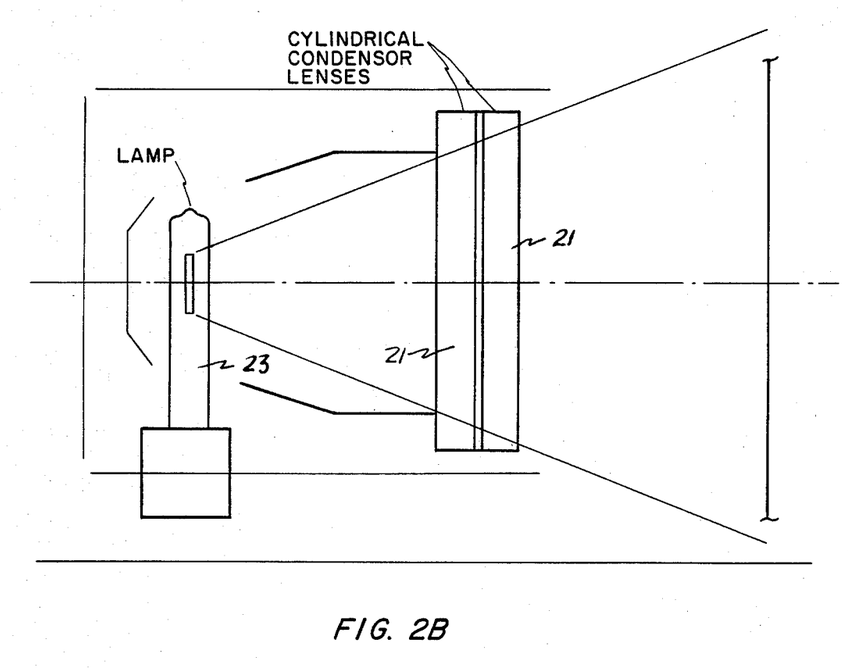
Figure 3A:
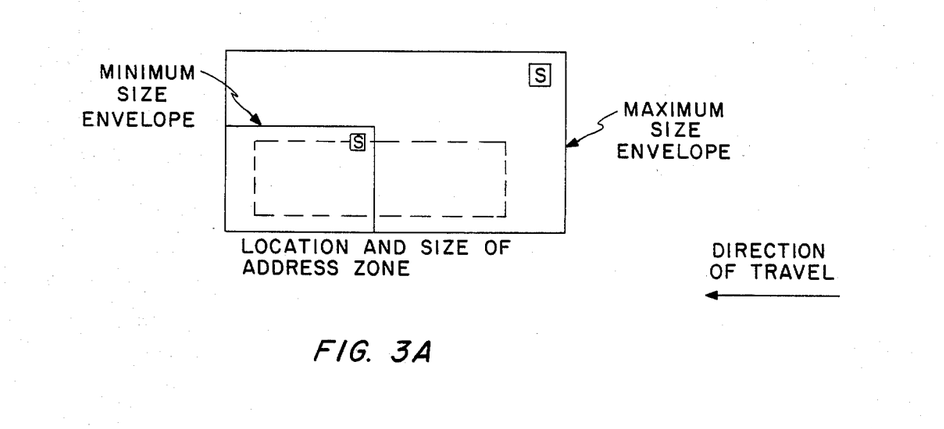
FIG. 3A is a view in elevation of the front of an envelope showing location of information where the stamp of the envelope is adjacent the upper envelope edge.
Figure 3B:
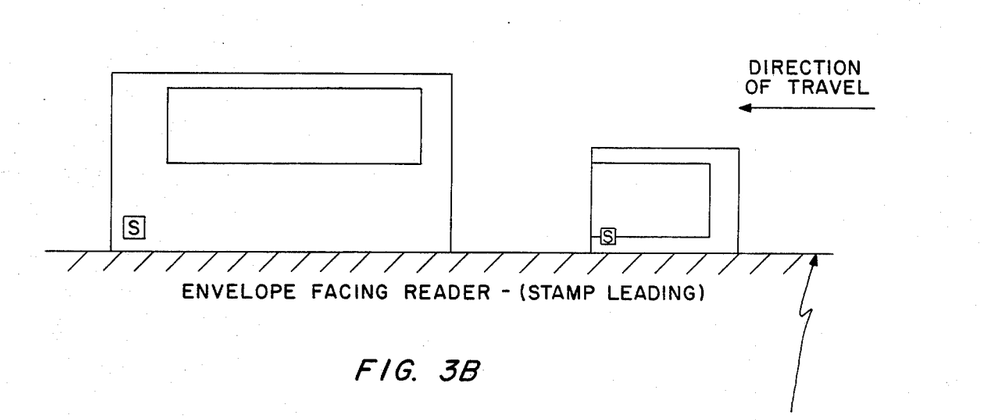
FIG. 3B is a front view of two envelopes in a stamp down condition relative to the scan apparatus of FIG. 1.
Figure 3C:
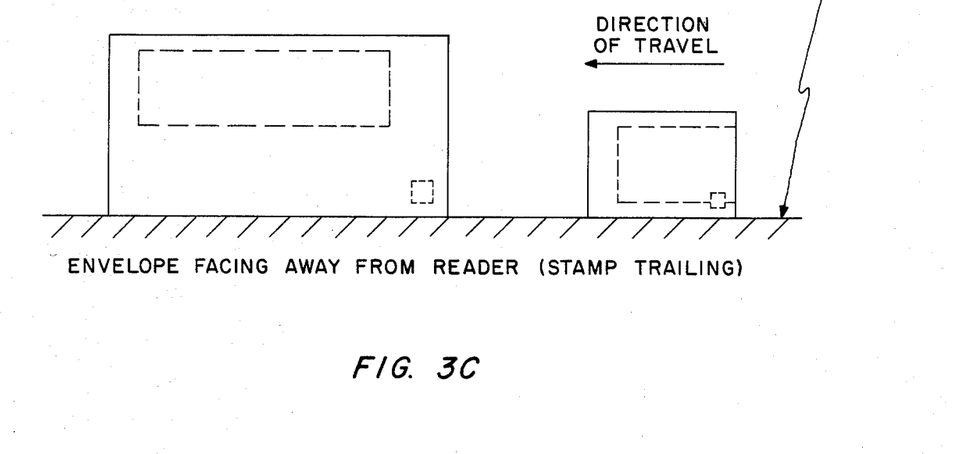
FIG. 3C is a rear view of the envelopes of FIG. 3B.

Also in FIG. 1, there can be seen, the illuminating apparatus comprised of two similar lighting systems 20A and 20B on opposite sides of the travel path, both inclined at an angle of about 35° from the travel path, the inclination having as its purpose the prevention of specular reflections from the envelope face being illuminated. These lighting systems (as shown also in FIG. 2) each include a high intensity halogen light source directed toward the scan area. The light sources, preferably 250 watt tungsten halogen lamps 23, are focused onto the travel path by means of cylindrical lens condensors 21.

Also shown in FIG. 1 directed at the travel path from positions normal to the travel path are two respective cameras or optical systems 22A and B, one on each side of the travel path. Each of these systems is essentially identical to the one shown in greater detail in FIGS. 2A and 2B.

In FIG. 2A, there is shown the preferred scanner system which includes the table or platform 12 bearing an envelope 13 held upright by suitable pinch rollers 32, adjacent a vertical plate 34 having a slit aperture 36 of predetermined size, long enough to expose to the camera system 40 the entire height of all possible locations of address zones of an envelope, an aperture preferably being about five and three quarters inches in height. Entry to the camera system is through a lens 42 at the focus of the camera system, and a visible band pass filter 44 to a photodiode array 46.

The scanner using the diode array 46 operates in a charge storage mode in which the output of each diode of the array is proportional to exposure, i.e., light intensity multiplied by the time interval between scans. The solid-state, self scanned linear array of photodiodes is located at the image of the mailpiece or envelope formed by lens 44, the array being positioned to give the required image magnification to match the height of the tallest letter to the length of the photodiode array. A suitable lens which could be used is a photographic lens of 12.5 mm focal length and f/1.4 aperture, chosen for its wide aperture, ready availability and low cost.

The camera system 40 is equipped with a visible light bandpass filter 44. This filtering is necessary because incandescent light sources exhibit substantial output at near infrared (I.R.) wavelengths. While the photodiode array is most sensitive to near I.R., many inks are transparent to I.R. Furthermore, photographic lenses are normally not colour corrected for near I.R. so that inclusion of I.R. would result in some loss of resolution. The visible bandpass transmission characteristic of the filter closely matches that of standard reflectance meters.

The entire camera is enclosed in a housing for protection of optical components from dust contamination. The mailpiece is viewed through a narrow vertical slit aperture in the housing to increase contrast at the sensor by eliminating extraneous reflected light.

The photodiode array of FIG. 2A may be part of a commercially available scanner such as that known as the Fairchild CCD133 unit. This unit has a linear array of 1024 silicon photodiodes spaced on 1 mil centers aligned to scan a vertical column on the face of an object such as the envelope passing the scanner.

It is to be noted that the apparatus herein described is designed for construction as a module to be integrated into a generally known mail transport apparatus called Facer-Canceller-Culler.

Viewing the operation of the system of FIG. 1, two scanning areas are provided, one on each side of the letter track, for stamp trailing and stamp leading envelopes. Each scanning area is illuminated by a high intensity halogen lamp 20A and/or 20B. An envelope approaching the scan zone has already been determined to be either stamp down and trailing or stamp down and leading. This information, obtained from the conventional Facer-Canceller-Culler, is utilized to enable the appropriate scanner.

The stamp position information is also used in conjunction with the information from a measuring line to determine the moment when the address scan is to begin. This measuring line consists of two longitudinally spaced photocells (not shown) located before the scanner in the direction of travel. The distance between the photocells is 9.5 inches, such that both will be covered by a maximum length envelope. Since the speed of the envelopes along the path is constant and the distance from the photocells to the scanner is known, the envelopes can be timed from either photocell to the scanner.

When a letter in the stamp down and trailing condition cuts the light to photocell PHB, the distance the letter must travel so that its address zone is jut before the scanner is known immediately, regardless of the length of the letter, since the address zone is a fixed distance from the leading edge of a letter. The distance a stamp leading letter must travel, however, depends on its length. See FIG. 3.

A stamp down and trailing letter is timed from the moment it cuts the light beam to photocell PHB. The scanning aperture for these letters is 0.5 inch past PHB, in the direction of letter travel. The letter must then travel 1.5 inches before the initiation of the scan, that is, 0.5 inch from the PHB beam to the scanning aperture plus one inch from the edge of the letter to the address zone. A counter is initiated in the Horizontal Address Zone Finder when the PHB beam is cut. The counter will continue timing to measure off the address zone and cut off the scanner at the address zone end. For a short letter, on which the address zone is less than 8.5 inches, the counter will cut off the scanner when the letter has travelled 0.5 inch after clearing the PHB beam.

For a stamp down and leading letter, both cells PHA and PHB are used to determine the start and stop of the scan, based on the length of the letter. The distance from the PHB beam to the scanning aperture for these letters is 1.2 inches. If, when a letter clears the PHA beam, its leading edge has already cut the PHB beam, the letter is at least 9.5 inches long and will have the full address zone. In this case, the scan is initiated after the letter has travelled 1.2 inches from the PHA beam, placing the address zone just at the scanning aperture. The scan will be stopped 0.2 inch after the letter clears the PHB beam. A letter shorter than 9.5 inches will clear the PHA beam before cutting the PHB beam, and its length will be established by timing the interval between the clearing of the PHA beam and the cutting of the PHB beam. The scan will be initiated when the letter has travelled 1.2 inches after cutting the PHB beam, and again the scan will be stopped 0.2 inch after the letter clears the PHB beam.

A third photocell, PHC, mounted above photocell PHB, works in conjunction with PHB to detect letter skew. Skew information is passed directly to the Microprocessor of the present apparatus which will make a decision based on letter skew and address skew information, whether or not to reject the letter as unprocessable by the present apparatus.

Each photodiode in the scanner array defines a scan area on the letter. Due to the image magnification of the scanning array camera, the area on a letter scanned by a diode is approximately 10 mils×10 mils.

Figure 4A:
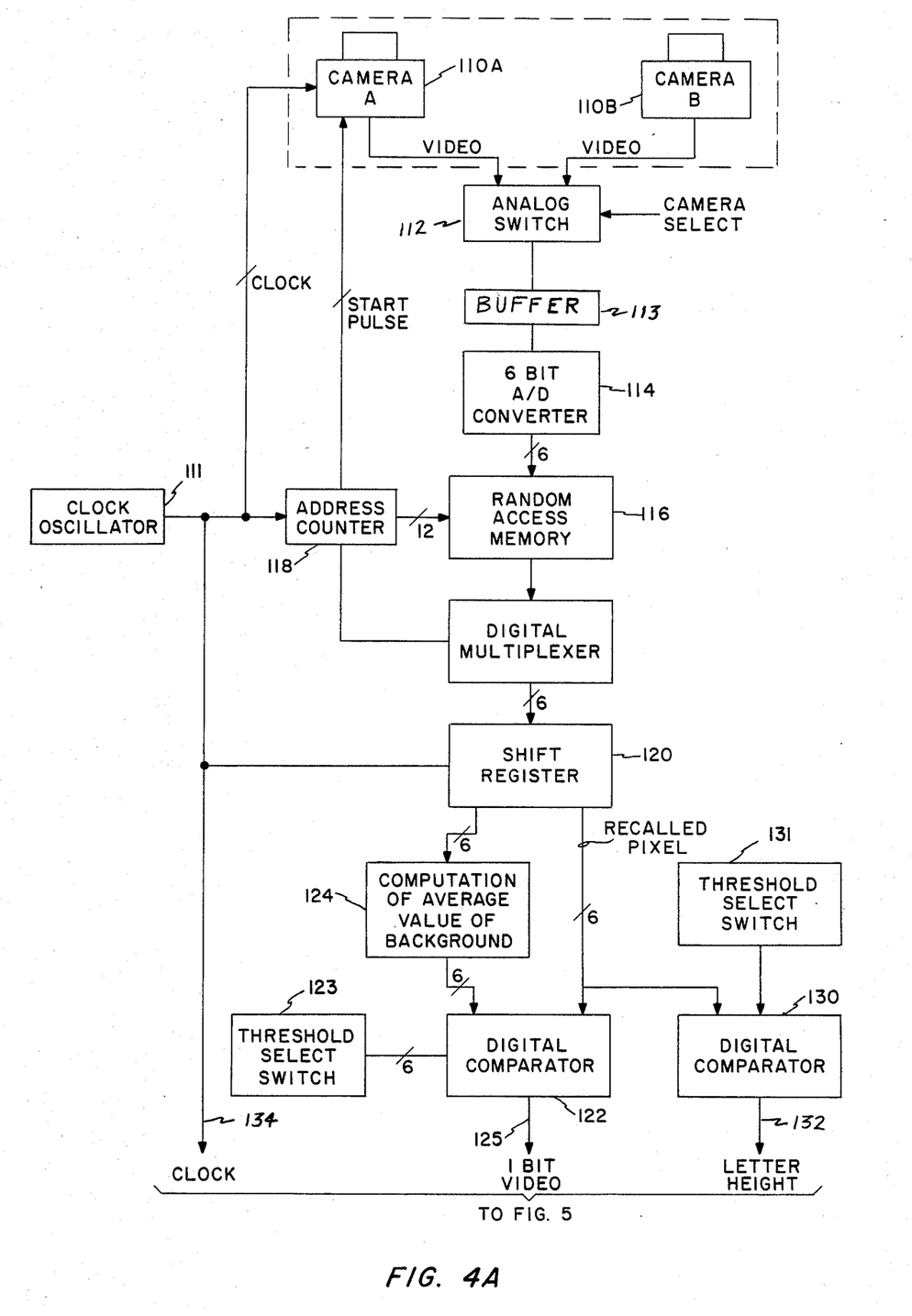
FIG. 4A is a flow chart for the processing of video information from the scan cameras.

The flow diagram in FIG. 4A shows the two cameras or camera systems 110 A and B each containing a photodiode array, one on each side of the envelope travel path. The output of one or the other camera system is selected by means of an analog switch 112, depending on which side of the approaching letter the stamp and address are located. Output current from each diode in the photodiode array is integrated on a capacitor (not shown) associated with the respective diode. The integrated output current is read out periodically on a video output path. The read out is controlled by a shift register scanning circuit (not shown) driven by a pair of complementary square wave clocks. Each scan is initiated by entering a start pulse into the shift register. After initiation of a scan the video signals from the diodes are read out as a series of varying voltage levels synchronized with a clock signal from clock oscillator 111 through a single output path. The scanner output is a train of 512 pulses known as picture elements or "pixels". The array described to this point in the description of FIG. 4A can be purchased as an "off the shelf" unit.

The video output from the selected scanner is buffered and converted to a step wave form by the Sample and Hold circuit 113. The signal is amplified in a variable gain amplifier to a level suitable for conversion to a six bit digital signal in the analog to digital (A/D) converter 114.

The six bit A/D converter 114 encodes each received pixel as one of sixty-four possible levels of gray with, for example, the darkest level of gray encoded as the highest number and lightest level of gray encoded as the lowest number. The digitally encoded values of each pixel are stored in a random access memory 116 at a sequence of addresses selected by an address counter 118.

Figure 4B:
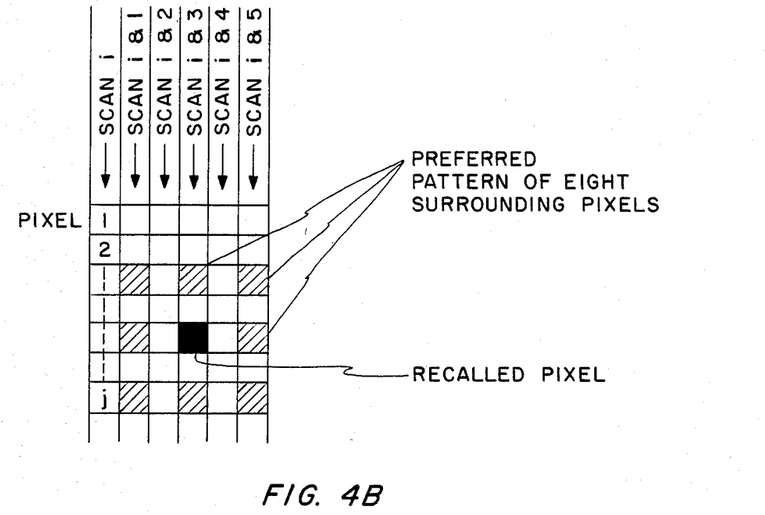

At any one time, the digitally encoded values or pixels for up to six complete scans of the diode array are stored in random access memory 116. These encoded values or pixels are recalled from the random access memory in the same sequence in which they were stored but at a somewhat later time, so that a selected pattern of up to eight other pixels immediately surrounding the recalled pixel are also simultaneously recalled. FIG. 4B shows one preferred location of the pattern of such surrounding pixels in relation to the recalled pixel. A shift register 120 is used to temporarily store the encoded values of the surrounding pixels. The average value of the surrounding pixels called the background is computed by dividing the sum of their values by the number of surrounding pixels in a chosen pattern.

The value of the recalled pixel is then compared in comparator 122 with the value of the computed background average from memory 124, and if it exceeds the background average by a value greater than the threshold as set by threshold select switch 123, then the recalled pixel is classified as black, represented logically as '1' on lead 124. Otherwise, the pixel is classified as white or logic '0'. Thus, a video stream initially encoded into 64 levels of grey (six bit video) is converted to a video stream encoded as either black or white (1 bit video).

A second comparator 130 having its threshold level set by threshold select switch 131 determines the height of the letter being scanned by detecting at which portion in the vertical scan the transition occurs from a dark background to the lighter surface of the letter. This measure of letter height on lead 132, the one bit video stream on lead 125 and the clock signal from clock oscillator 111 on lead 134 are transmitted to additional circuitry as described in the flow chart of FIG. 5.

Figure 5:
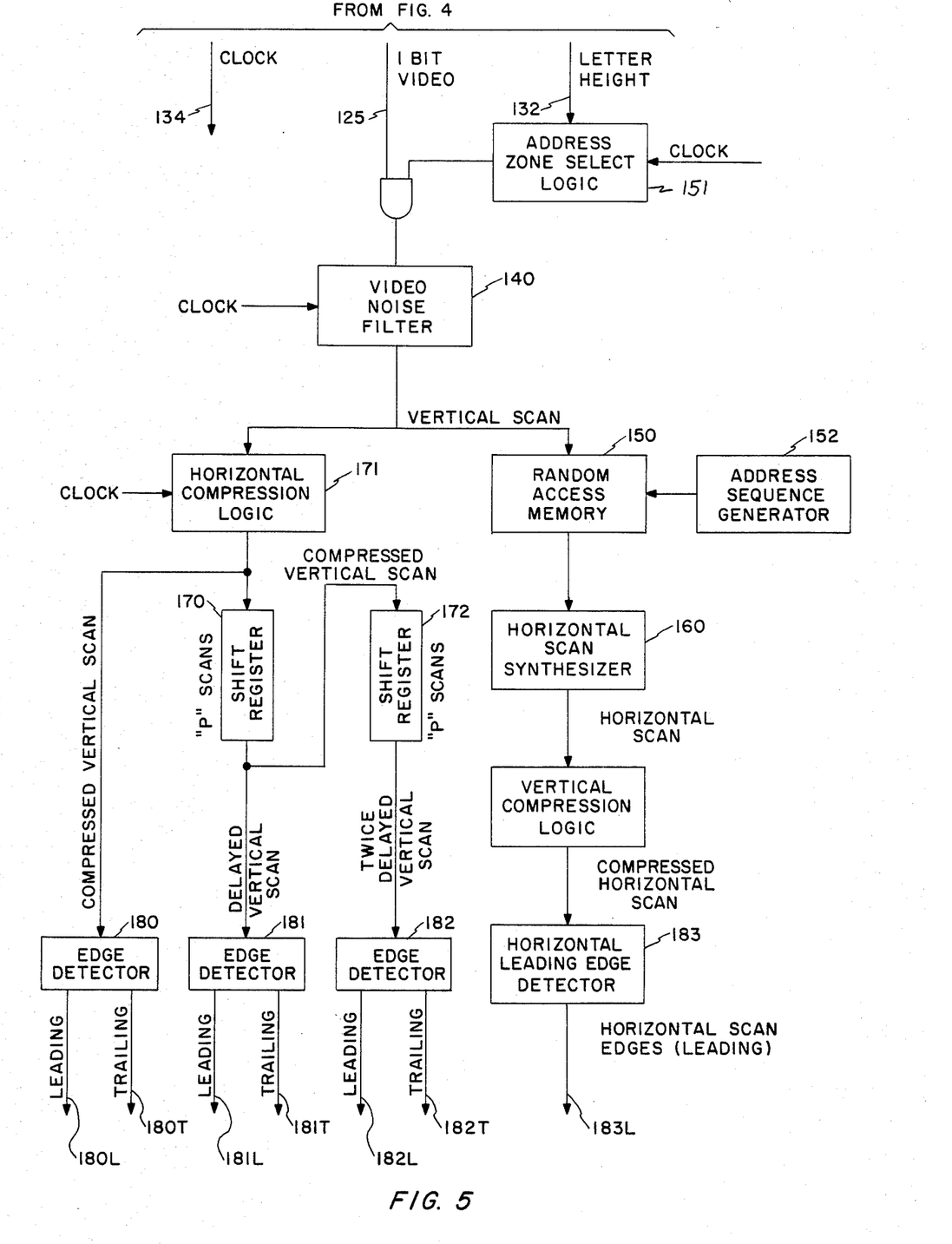
FIG. 5 is a flow chart for the processes of horizontal scan generation, video compression and edge detection used herein.

In FIG. 5, the letter height information is used to select only a predetermined portion of the vertical scan. This portion of the scan corresponds to a zone on the envelope in which the destination address is most likely to be located. The remainder of the scan is ignored. For example, the scan can start one half inch from the top of the envelope and terminate two and three quarter inches lower.

The gated portion of the scan is passed through a noise filter 140. Electrical noise from external sources or resulting from variations in sensitivity from diode to diode in the diode array, often results in the generation of isolated black (noise) bits which are not related to the material being scanned. The filter removes from the video stream single black bits (logic '1') which are surrounded only by white bits (logic 0). These isolated bits are removed from the video derived signals because they may adversely affect further signal processing.

While the one-bit video stream shown as an input on lead 125 to the circuit of FIG. 5 represents a series of bits derived from vertical scans down the face of the letter, as it moves past the scanner, it is more conventient for some subsequent signal processing to have in addition a video stream which represents a series of horizontal scans i.e., scans in the same direction as the letter movement. In the invention, such a horizontal scan is synthesised from the vertical scans as described below.

The one bit video stream representing some convenient number 'N' of successive scans is stored at sequential addresses in a random access memory 150 until the video signals from all 'N' scans are stored. The signal data is then recalled from the memory by using a different sequence of addresses such that the first bit of the first scan is followed immediately by the first bit of the second scan which is in turn followed by the first bit of the third scan and so on for 'N' scans. These sequences are generated in the generator 152.

The sequence now moves to the second bits of each scan, followed in turn by the third bits of each scan and so on. The new video stream thus formed now comprises the equivalent of a series of horizontal scan segments, each succeeding segment located immediately below the preceeding segment. The number of scans 'N' can be made large enough to include all the scans necessary to scan the longest possible letter. This, however, would be impractical as it would require a very large memory and would result in an unacceptably long delay in the data stream since the first horizontal scan cannot be completed until after the last vertical scan has been stored. On the other hand, the number of scans 'N' cannot be made too small or useful information contained in the horizontal scan segments would be lost. For example, two practical values of 'N' are 64 and 128 corresponding to scan segments on the letter face of approximately one half inch and one inch respectively. The synthesis of the horizontal scan requires that the random access memory be divided into two equal portions so that when one half is being loaded with vertical scans, the other half having been loaded with the previous set of 'N' scans is used to synthesize the horizontal scan corresponding to that set of scans.

A distinguishing feature of machine imprinted characters when compared to handwritten characters is the highly regular character spacing, character height, and inter-line (vertical) spacing. However, the strokes which make up the imprinted characters are the items which are sensed by the scanner, and in general they are not very regularly spaced. Thus, the spacing of the strokes cannot in itself be used as a feature to reliably distinguish machine imprinted characters from handwritten characters. The extraction of character spacing, character height, and line spacing information from the stroke spacing information can be considerably enhanced however, by a process called video compression.

For example, vertical compression of the horizontal scan includes the following logical operations:

As a given video bit of the horizontal scan emerges from the horizontal scan synthesizer 160 in FIG. 5, a number 'M' of vertically adjacent bits (which includes the merging bit) are also simultaneously recalled from the random access memory 150. All 'M' bits are now examined and if one or more bits of the 'M' bits is black (logic 1) then the emerging video bit is replaced by a logic '1'. If, however, all 'M' bits are white (logic 0), the emerging video bit is replaced by logic '0'.

Alternatively, majority logic may be applied to the compression process as follows:

For example, if two or more bits of the 'M' bits are black, then the emerging video bit is replaced by a logic '1'. However, if less than two bits are black, then the emerging video bit is replaced by a logic '0'. The number 'M' in this version is switch selectable and can range from 2 to 8.

Vertical compression of horizontal video as described above, tends to fill in the white spaces inside printed characters but tends to preserve the white space between adjacent characters, due to the fact that these intercharacter spaces are relatively tall compared to the spaces enclosed by the character. Individual characters in video compressed in this manner tend to be filled in so that they appear roughly rectangular in shape with few internal voids. Thus, compression emphasizes character outline and individual strokes comprising the character tend to be de-emphasized.

Similarly as shown in FIG. 5 horizontal compression is applied to the vertical video scan in horizontal compression logic 171, with the range of compression also being switch selectable in the range 2 to 8. Horizontal compression not only tends to fill in the white spaces within characters but fills the intercharacter spaces also so that lines of print appear as straight black bars of nearly uniform width and containing few if any white voids. Thus, character height and address line spacing are emphasized and individual strokes composing individual characters again are de-emphasized.

As explained above, the range of compression for both the vertical and horizontal compressions are switch selectable. This will allow experimentation to select the optimum compression and maximization of scores for print/handwriting discrimination. Referring to FIG. 5, the horizontally compressed vertical scan is passed through a pair of shift registers 170 and 172 each of which can hold an integral number 'P' of complete scans. Outputs from the first and second of these shift registers are vertical scans which are delayed from the original scan by 'P' and 2×'P' scans respectively. The number 'P' is switch selectable in the range 2 to 8. The purpose of these two delayed scans will become apparent in the description of FIG. 7A.

Again referring to FIG. 5, all vertical and horizontal compressed scans are passed through edge detector circuits 180, 181, 182 and 183 to produce leading edge signals on leads 180L-183L and trailing edge signals on leads 180T-182T.

The leading edge detector essentially modifies the video stream so that only the leading black bit (logic '1') of any group of adjacent black bits is retained. All other black bits in the group are replaced by a white bit (logic '0'). Similarly, the trailing edge detector retains only the trailing black bit of a group of adjacent black bits. These detected edge pulses invariably define the location of character or address line margins.

Figure 6:
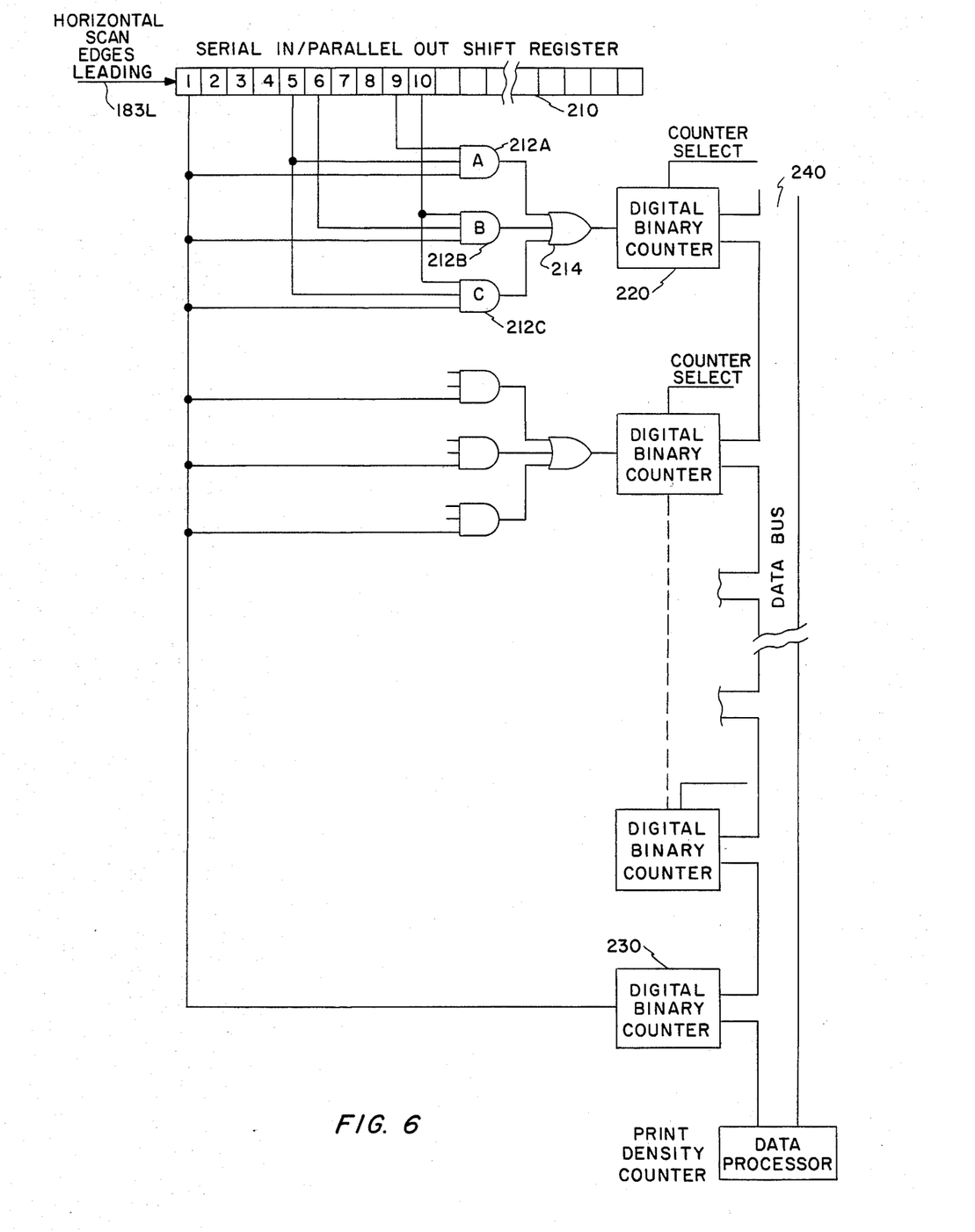
FIG. 6 is a schematic of the horizontal edge spacing detection circuitry.
Figure 7A:
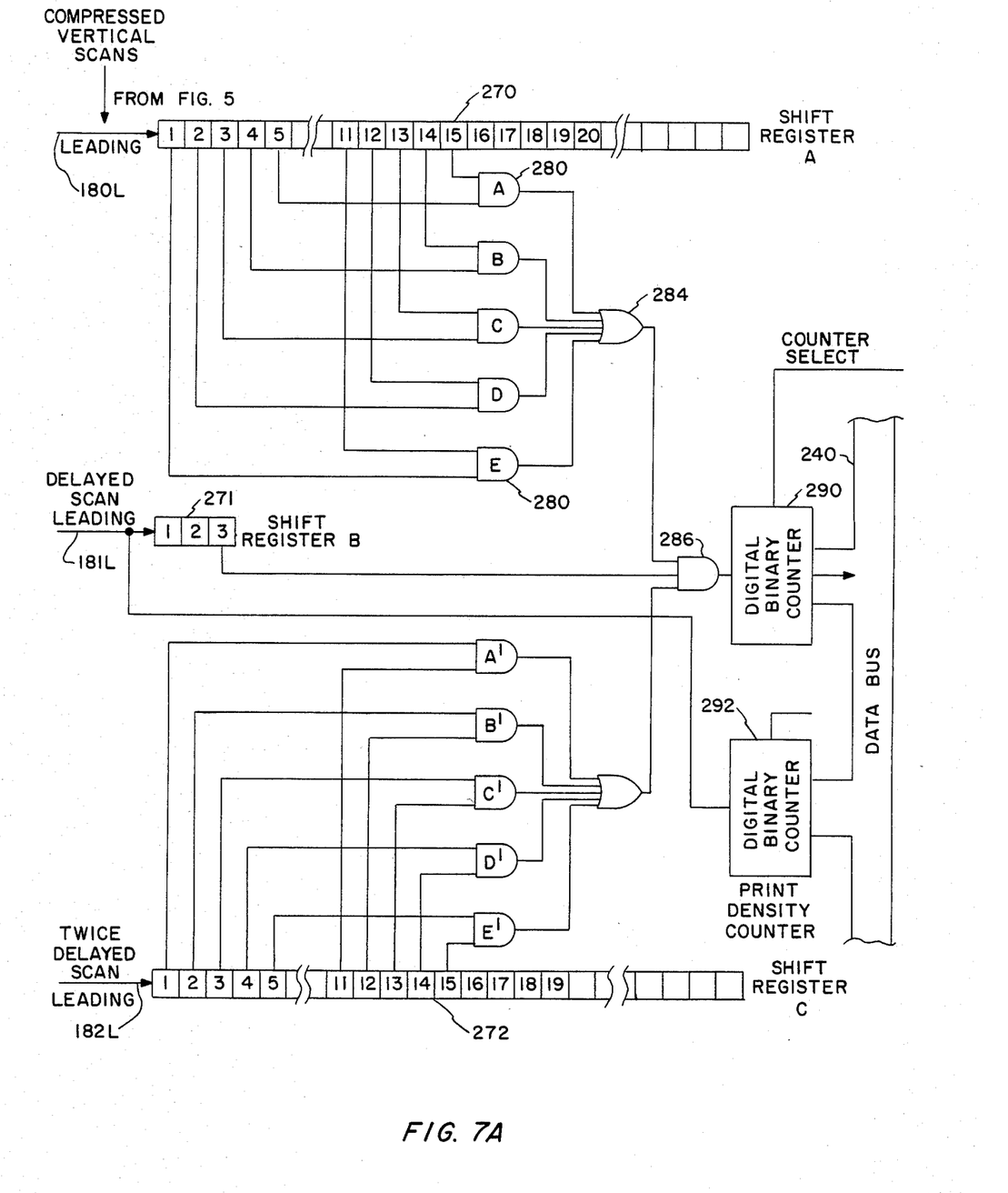
FIG. 7A is a schematic of the line spacing detection circuitry.
Figure 8:
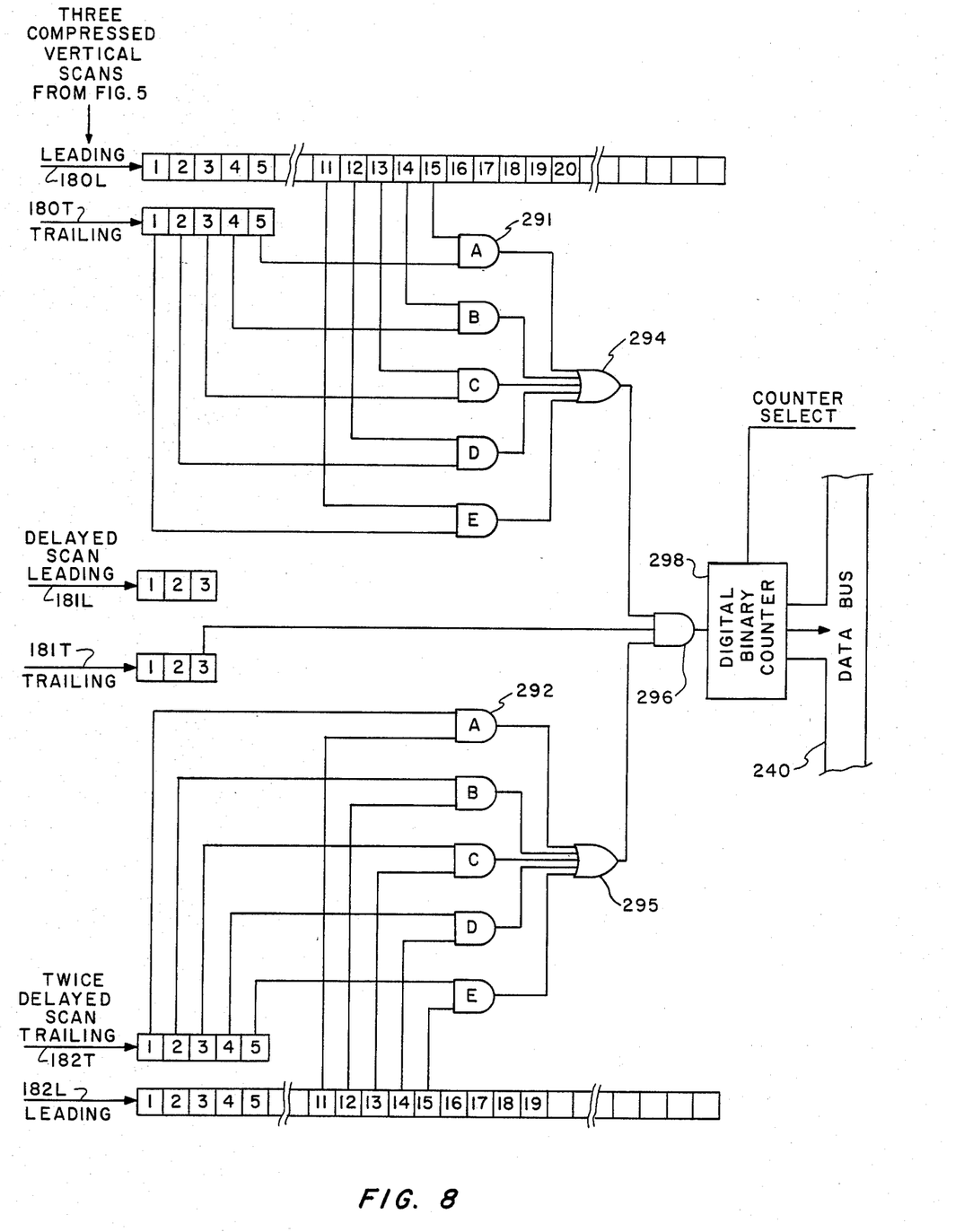
FIG. 8 is a schematic of the character or line height detection circuitry.

The high degree of regularity associated with character spacing, character height and line spacing of machine printed characters is measured and quantified as shown in FIGS. 6, 8 and 7A respectively. To measure regularity of character spacing, the video stream of leading edges of the horizontal scan from FIG. 5 is clocked into and through a serial in/parallel out shift register 210, each stage of which is represented by a square in FIG. 6. Parallel outputs which are separated by an integral number of stages of the shift register, and correspond to bits in the video stream which are separated by an equal number of clock cycles are combined in AND gates as shown in FIG. 6. As an example, the uppermost AND gate 212A in FIG. 6 is connected to receive video bits separated by four clock cycles.

Whenever a particular separation of edge pulses occur in the video stream passing through the shift register, the output of the AND gate connected to this particular separation outputs a pulse.

Since the photodiode array described previously is inherently a data sampling device, roundoff or truncation errors occur in the output video stream. For example, when scanning a pattern of black bars whose pitch corresponds to a spacing of precisely 4.5 diodes, the resulting signal in the video stream may indicate a spacing of four bits then five bits, then four bits and so on. To allow for this possibility two additional AND gates, Gate 212B and Gate 212C in FIG. 6 are used. Gate 212B is connected to detect a separation of 4 bits followed by a separation of 5 bits. Gate 212C is connected to detect separation of 5 bits followed by a separation of 4 bits.

The output of each group of three AND gates such as 212A-C are OR'ed together within OR gates such as 214 and connected to a digital binary counter 220. The binary counter counts the number of output pulses from the three AND gates that occur while a predetermined area of the letter is scanned. The output count of the counter at the end of a fixed interval of time is a measure of the frequency of occurance of the particular leading edge spacing in the video stream.

Many such combinations of three AND gates OR gates and digital counters are in fact connected to the outputs of the shift register which are separated by other integral numbers of stages. For the sake of clarity the connections of these other gates are not shown in FIG. 6. In one embodiment of this invention 23 such combinations are used connected for shift register stage separations of 4 to 27 inclusive.

An additional counter 230 is used to count the total number of input pulses during the interval in which signals are fed to the shift register 210. This count is called the "print density" and is used in subsequent signal processing.

Since the length of the horizontal scan segments is limited by practical considerations as discussed previously, discontinuity errors in the spacing of the edge pulses can occur. These are known as errors due to a finite sampling window. In simple terms, the spacing between the last edge pulse of one scan and the first edge pulse of the next scan would be registered in one of the counters. This data would bear no relationship to the pattern being scanned as the point of termination and beginning of each scan segment is arbitrary.

To eliminate completely such "windowing" errors, the shift register 210 is preloaded with the data pattern of the previous scan segment at the same height on the letter being scanned. This data pattern is available from the random access memory 150 shown in FIG. 5 which was used to synthesize the horizontal scan segments. Preloading can be done in a parallel fashion but in the preferred embodiment of the invention it is done serially during the time when areas of the letter which are outside the scan zone is being scanned. The video data stream corresponding to these areas is gated out by the Address Zone select logic 151 shown at the top of FIG. 5.

At the end of the fixed interval of time which corresponds to the interval during which a predetermined area of the letter is scanned, the binary counts (called "Scores") in all the counters are stored in an allocated portion of a random access memory by a microprocessor, via its data bus 240. Each counter is reset after the previous contents are stored.

Regularity of address line spacing is measured by the circuit shown in FIG. 7A. Momentarily referring back to FIG. 5, the outputs from the leading edges detectors of the three compressed vertical scans on leads 180L-182L are clocked into three shift registers 270,271 and 272 in FIG. 7A. In the example shown in this figure, sets of five AND gates 280A-E and 280A'-E' are connected to shift registers 270 and 272, respectively, at outputs separated by ten stages (bits). In practice, 28 such sets of AND gates are employed, each set detecting a particular address line spacing. The line spacings detected will range from 10 bits separation to 37 bits. These numbers have been selected from experimentation from print within the range of interest. The outputs of the sets of five AND gates such as 280A-E are OR'ed so that an output from any AND gate results in an output from the OR gate 284. The outputs of the OR gates are in turn ANDed with the output of the third stage of shift register 217 in AND gates such as 286. The effect of this logical operation is to accept only the output of one of the set of five AND gates whose output occurs simultaneously with a leading edge pulse in shift register 271.

This logical operation is necessary to make the line spacing detector insensitive to small skews (up to +15°) whether in the envelope being scanned or in the misalignment of the imprinted address relative to the bottom edge of the envelope.

Figure 7B:
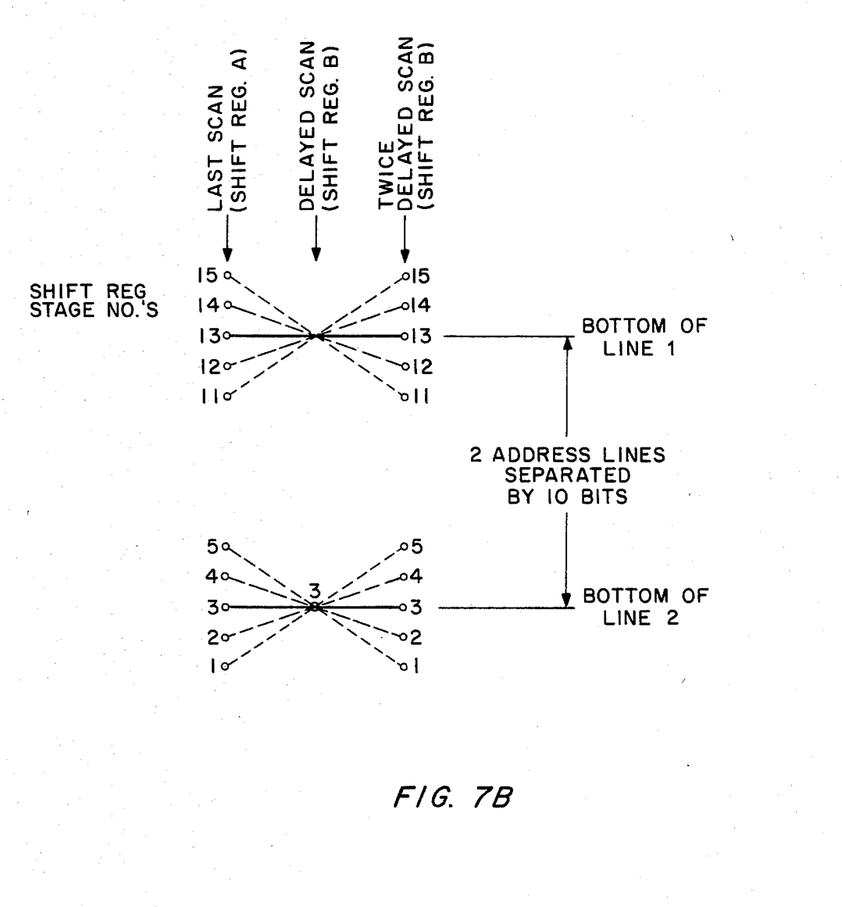
FIG. 7B is an illustration of envelope or print skews detectable by the line spacing detector.

FIG. 7B is presented as a further illustration of the operation of the Line Spacing Detector. Shown are the bottom of two address lines separated by 10 bits and all the possible skews of these two lines which would be detected by the circuitry of FIG. 7A.

The principle behind the line spacing detector is to correlate to compare the line spacings at many sets of two separated points along the direction of envelope travel. This separation corresponds to the distance the envelope travels in the delay time of the twice delayed scan. For example, the separation is approximately one eighth of an inch in the case where the number "P" in FIG. 5 is equal to eight.

The purposes of the input from shift register 271 (FIG. 7A) in the middle of the separation shown as point 3 in FIG. 7B is to restrict the output of the line spacing detector to a single pulse for each line crossing (bottom of address lines). Without this input, the sets of 5 gates from shift registers 270 and 272 would produce up to 5 pulses for each set of line crossing at a given spacing. Each output pulse corresponds to the occurence at two address lines separated by a spacing within the range of interest (10 to 37 bits). These outputs are counted by a series of digital binary counters, such as 290, one for each possible line spacing in the range of interest. The total number of leading edge pulses is also counted by counter 292. This count is called print density, and is a measure of the total number of line crossings encountered. It is used as a normalizing factor. Periodically, the output counts of each counter (such as 290) known as "Scores" are transferred to a random access memory (not shown) as described in connection with FIG. 6.

Regularity of character (line) height is measured by the circuit of FIG. 8. The circuit components and principle of operation are substantially identical to those described for FIG. 7A except that measurements are made from leading edge to trailing edge (bottom to top of each address line) rather than from leading edge to leading edge (bottom of one line to bottom of another line). Through the use of AND gates 291A-E, AND gates 292A-E OR gates 294 and 295, AND gate 296 and counter 298 scores are accumulated for each character height in the range of interest. Again the data is fed to data bus 240 for input to the random access memory.

At the completion of the scanning of a particular letter and as the result of the signal processing described in connection with FIGS. 6, 7 and 8, there will exist in the random access memory of the microcomputer (which typically may be an INTEL 8086 processor), all the counts or scores corresponding to all areas of the address zone of the letter. The location on the envelope or co-ordinates of each score is known by virtue of the memory address at which it is stored.

All data processing described subsequently is performed by the microprocessor using data stored in the random access memory and arriving in the end at a print/no print decision as will now be described.

The first task performed by the microprocessor is to subdivide the envelope Address Zone into Information Blocks. An Information Block may be the forwarding address, another the return address—other blocks of information may also be present as for instance the stamp and cancellation areas, or any advertising printed on the face of the envelope. The process of blocking is performed in order to improve the print/handwriting discrimination. It is especially useful when mixed print and handwriting are found on the envelope, as for instance when the return address is handwritten and the forwarding address printed or vice versa, or when different sizes of print are employed in different areas of the envelope. The reason the separation of blocks improves the print/handwriting discrimination is because of another operation which is performed, that of Normalization.

This normalization operation is the process by which the Scores obtained as previously explained, are divided by the Print Density factor. This operation is in itself necessary to compensate for the fact that an envelope may contain several more address lines than another. As an illustration, assume two envelopes are examined, one with six address lines and one with three. Assume further that the total number of character spaces at frequency fn equals 60 for the first envelope and 30 for the second envelope, where fn is frequency with the highest score for the envelope in question. Obviously if each score is examined without Normalization a large disparity exists. Assume further that the Print Density score for the 6 line address equals 100 and for the 3 line envelope equals 50. When the two scores are normalized with the appropriate Print Density they will both yield a result of 0.6 which constitutes a truer indication of the print/handwriting contents of the envelope independent of the size of the address. Given then that Normalization is required, it becomes obvious that Normalization on a per block basis is preferred when mixed print or print and handwriting are present. As an illustration assume that an envelope with mixed print yields a character spacing score of fa=60 and a print density of 100 for the forwarding address block and a character spacing score of fb=30 and a print density of 50 for the return address. Note that fa and fb are the two highest frequency obtained from the two blocks but since the two prints are not the same then fa is not the same frequency as fb. If the address zone were to be examined as a whole the following scores would be obtained.

| Highest Frequency = | fa = 60 |
| Total Print Density = | 100 + 50 = 150 |
| Normalization = | 60/150 = 0.4 |

However, if the address zone were subdivided into blocks the following two cases would exist.

| CASE I (Return Address) | CASE II (Forward Address) |
|---|---|
| Highest Frequency = fb = 30 | Highest Frequency = fa = 60 |
| Block Print Density = 50 | Block Density = 100 |
| Normalization = 30/50 = 0.6 | Normalization = 60/100 = 0.6 |

The obvious result is that the results produced by fa and fb are not diluted by the print density of a block at a different frequency.

The actual process of blocking is performed by the microprocessor by examining the density maps produced by the print density counter shown in FIG. 6 and stored in memory. Areas with adjoining print density above a preset threshold value are connected together as blocks.

The microprocessor examines all the horizontal print density scores (available from the print density counter shown in FIG. 6). Horizontal scores originating from each counter in FIG. 6 and corresponding only to areas inside each Information Block are then consolidated by summing. The average of all horizontal scores within each Information Block is computed and subtracted from each consolidated horizontal scores for that block. All positive remainders are summed. This sum is normalized by dividing by the total horizontal print density for the Information Block in question and is stored for further processing as the total horizontal score for that Information Block.

The Vertical scores originating from the line spacing detectors and counters shown in FIG. 7 and from the character or line height detectors and counters shown in FIG. 8 are processed separately but in a similar manner as described below.

Vertical scores are processed for only those portions of the address zone which overlap the identification Blocks identified earlier in arriving to the total horizontal scores. As with the processing of horizontal scores the average of scores originating from each counter in FIG. 7 and from each counter in FIG. 8 are subtracted from each score in turn. All positive remainders are summed and the sum is normalized by dividing by the vertical print density originating from the print density counter shown in FIG. 7. The two results are stored for further processing.

Two additional factors are computed from the vertical scores, one from line spacing and one from character height. For both line spacing and line height scores, total counts originated from pairs of adjacent counters are subtracted, one from the other. Each difference is squared and the squared quantities summed. The square root of the sum is computed and the results in each of the two cases normalized by dividing by the vertical print density.

At the end of these computations for each detected Information Block, the following quantities or "computed scores" will exist in memory, each having been normalized by division by the appropriate print density.

HORIZONTAL (CHARACTER SPACING)

1. Average of all scores.
2. Peak (highest score) minus the average of all scores.
3. Sum of the excesses of all scores over the average score.

VERTICAL (LINE SPACING)

4. Peak (highest score) minus the average of all scores.
5. Sum of the excesses of all scores over the average score.
6. The square root of the sum of the squares of the difference between pairs of adjacent counters scores.

VERTICAL (CHARACTER/LINE HEIGHT)

7. Peak (highest score) minus the average of all scores.
8. Sum of the excesses of all scores over the average score.
9. The square root of the sum of the squares of the difference between pairs of adjacent counter scores.

The print/no print decision is arrived at by computing the weighted sum of the above nine computed scores for each information block in the address zone. These quantities are then compared with a fixed threshold quantity to be set experimentally. If the threshold is exceeded the letter is termed machine imprinted and an output signifying this conclusion is generated.

What is claimed is:

1. An apparatus for evaluating information on a surface of an object being transported past a fixed point comprising: means for sensing the presence of said object in said apparatus to enable scanning of said surface, means enabled by said sensing means for scanning said surface due to movement of said object past said sensing means, means for receiving signals from said scanning means and for generating first serial streams of data representing successive lines of information on said object in one direction of scan, means for disposing bit of said first serial streams in a different order to provide a second serial data stream representing scan results from successive lines of information for only a direction orthogonally related to said one direction, and means coupled to said means for receiving and generating and said means for disposing responsive to said first data streams directly and said second data stream to determine characteristics of said information on said surface of said object.

2. An apparatus as claimed in claim 1 in which said scanning means comprises an alignment comprised of a plurality of optical light detecting elements normal to the direction of transport of the object, and in which there are means for storing data derived from each element in the optical detection.

3. An apparatus as claimed in claim 1, in which the said data generating means comprises an analog to digital converter for converting the data from each element to digital form.

4. Apparatus as claimed in claim 3, in which said optical detecting means comprises a stationary vertical array comprised of a plurality of closely spaced photoelectric diodes.

5. An apparatus for optically viewing a face of an object being transported at a predetermined speed past a point, said apparatus including means for illuminating said face of said object, stationary optical detecting means aligned in one direction substantially normal to the direction of transport of said object for detecting successive alignments of markings on said face of said object, means for deriving a series of analog signals from each detected alignment of said markings, means for converting said analog signals into binary data, means for storing said means for converting in first serial streams of bits representing said markings of said object sequentially in said one direction, means for disposing bits of said first serial streams in a different order to provide second serial streams of bits of data representing said markings in the direction of transport of said object, and means coupled to said means for storing and said means for disposing responsive to said first serial stream of bits directly and said second serial stream of bits to enable analysis of the condition of said markings on said object.

6. Apparatus as claimed in claim 5, in which said detecting means comprises at least one photocell opposite the illuminating means to sense an object between the illuminating means and the photocell, said apparatus adapted for optically viewing any markings on the surface of an envelope transported on an elongated edge thereof, said apparatus including an alignment of individual optical sensing elements deployed normal to the direction of transport of the envelope, means for receiving the results of sensing by the elements as a series of analog signals during each of a plurality of successive scans, means for converting the results of each sensing element into a serial multi-bit digital signal representing the condition of said surface sensed by a respective element, means for storing the multi-bit digital signal representation for each scan, means for comparing each stored representation against an average value based on the representations of surrounding elements for converting said representation into a single bit representative of the condition on said surface representing the results of the sensing from each element during a single scan, memory means for storing the results of a plurality of scans in single bit format for each element, and means for deriving from said memory means a plurality of bits each representing respective sensing results in the direction of transport of the envelope.

7. Apparatus as claimed in claim 6, in which said deriving means comprise a synthesizer for producing a plurality of single bit signals each representing a like element from successive scans in the direction of travel of the envelope.

8. A process for optically viewing the opposite faces of an envelope transported on an elongated end past a viewing apparatus to decide whether address information on the face of the envelope is printed, the steps of illuminating the opposite faces of the envelope, enabling a video output of a sensing apparatus individual to the face determined to have the address information thereon as the envelope passes a predetermined point in the viewing apparatus, vertically scanning the illuminated face successively using a multiple stationary element scan across the face of the envelope to transmit analog signals serially from the video output apparatus to a data processor, producing a digital output from said analog signal for transmission to the data processor for analysis, deriving horizontal scan data from successive vertical scan signals to produce an orthogonal survey of the illuminated envelope face, storing data from said survey and compressing the stored data binarily to produce representations of lines of characters within the address information, and thereafter deriving leading and trailing edge indications from the character representations.

9. The process of claim 8, further comprising the steps of counting leading edge indications of vertically spaced lines of characters for a predetermined time interval to measure the density of print within the address information.

10. The process of claim 9 further comprising the steps of measuring the spacing between leading edge and trailing edge data of characters in a line during a predetermined time interval to determine spacing between address characters.

11. A process for scanning and analyzing address data on a surface of an object being transported past a fixed point comprising the steps of optically scanning said surface to read out sequentially a measure of the darkness of address markings on said surface in a linear scan as a series of analog signals, converting said analog signals to digital signals and storing said digital signals representing a successive plurality of sequential scans, comparing each signal with surrounding signals representing darkness markings to determine a threshold signal level, converting each of said digital signals to a binary bit based on said threshold level, storing said binary bits, reading said stored binary bits in a different order to provide further binary bits, producing from said binary bits directly and said further binary bits a two directional pattern representative of a rectangular area on said surface of said object, and compressing said pattern to develop leading edge data for subsequent calculation of height, regularity and spacing of said address data.

12. Apparatus for scanning and analyzing address data on a surface of an object being transported past a fixed point comprising stationary means for illuminating said surface of said object, an optical scan array spaced from said object to read out in analog form data signals defining darkness characteristics of said address data read by said array, means for converting said analog data signals to digital signals, means for storing said digital signals representing a plurality of sequential scans, means for sequentially comparing each of said digital signals with digital signals representing surrounding areas on said surface of said object to produce a binary bit for each of said digital signals based on the comparison in said comparing means, and means for rearranging the order of said binary bits to provide further binary bits, said binary bits employed directly and said further binary bits provide a bidirectional pattern representative of a rectangular area on said surface of said object.

13. Apparatus as claimed in claim 12, in which said optical scan array comprises a vertical alignment of optical diodes, and in which there are means for reading the signals from each of said diodes to produce a series of signals from each scan of said array.

14. Apparatus as claimed in claim 13, in which there are sample and hold means for converting the signals of the last-mentioned series of signals into step wave form signals for transmission to said analog to digital conversion means.

15. A process for determining characteristics of multiple line address lettering on the face of an envelope comprising the steps of: scanning an area on the face of the envelope during movement of the envelope past an optical scanner, producing from horizontal and vertical scan signals an orthogonal representation of the area of the envelope face in binary form, compressing the orthogonal representation in the horizontal direction, compressing the representation in the vertical direction, determining leading edge indications of characters within the address from the compressed vertical scans, delaying representations of the leading edge indications, determining leading edge indications of characters from the horizontal compressed representations, delaying representations of the horizontal leading edge indications, combining signals from said leading edge and delayed leading edge signals to produce a measure of the density of lettering in the compressed area.

16. A process as claimed in claim 15, in which compressed areas having a print density above a predetermined level are analyzed individually.

17. A process for determining characteristics of multiple line address lettering on the face of an envelope comprising the steps of: scanning an area on the face of the envelope during movement of the envelope past an optical scanner, producing from horizontal and vertical scan signals an orthogonal representation of the scanned area of the envelope face in binary form, compressing the orthogonal representation in both the horizontal and vertical directions, determining leading edge indications of characters within the address from the compressed scans, delaying representations of the leading edge indications by predetermined time intervals for the vertical scan and by another time interval for the horizontal scan, combining signals from said leading edge and delayed leading edge signals to produce counts from the respective horizontal and vertical directions for determining of the density of lettering in the compressed area.

18. A process as claimed in claim 17, further including the steps of determining trailing edge indications of characters in the vertical direction and delaying trailing edge indications by set amounts, combining the trailing edge and trailing edge delayed signals to produce a measure of spacing vertically between characters.

19. A process as claimed in claim 18, further including the steps of combining the leading edge and delayed representations to determine a measure of the uniformity of lettering within the scanned area.

* * * * *